(12) United States Patent
McNamee

(10) Patent No.: US 10,339,972 B2
(45) Date of Patent: *Jul. 2, 2019

(54) SYSTEMS AND METHODS OF INTERACTIVE EXERCISING

(71) Applicant: OUTSIDE INTERACTIVE VISUAL SOLUTIONS CORPORATION, Hopkinton, MA (US)

(72) Inventor: Gary McNamee, Hopkinton, MA (US)

(73) Assignee: OUTSIDE INTERACTIVE VISUAL SOLUTIONS CORPORATION, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/921,951

(22) Filed: Mar. 15, 2018

(65) Prior Publication Data

US 2018/0204595 A1 Jul. 19, 2018

Related U.S. Application Data

(63) Continuation of application No. 14/168,349, filed on Jan. 30, 2014, now Pat. No. 9,959,902.

(Continued)

(51) Int. Cl.
| | |
|---|---|
| *A63F 9/24* | (2006.01) |
| *A63F 13/00* | (2014.01) |
| *G06F 17/00* | (2019.01) |
| *G06F 19/00* | (2018.01) |
| *G11B 27/00* | (2006.01) |
| *A63F 13/211* | (2014.01) |
| *A63F 13/67* | (2014.01) |

(Continued)

(52) U.S. Cl.
CPC .......... *G11B 27/005* (2013.01); *A63F 13/211* (2014.09); *A63F 13/212* (2014.09); *A63F 13/67* (2014.09); *A63F 13/816* (2014.09)

(58) Field of Classification Search
CPC ........ A63B 24/0021; A63B 2024/0025; A63B 24/0062; A63B 24/0084
See application file for complete search history.

(56) References Cited

U.S. PATENT DOCUMENTS

| | | | |
|---|---|---|---|
| 6,312,363 B1 | 11/2001 | Watterson et al. | |
| 6,626,799 B2 | 9/2003 | Watterson et al. | |

(Continued)

OTHER PUBLICATIONS

Hammacher Schlemmer: The Virtual Reality Treadmill, Dec. 15, 2012.<http://web.archive.org/web/20121215041356/http://www.hammacher.com/Product/11945?>.

(Continued)

*Primary Examiner* — Milap Shah
*Assistant Examiner* — Jason Pinheiro
(74) *Attorney, Agent, or Firm* — Lando & Anastasi, LLP

(57) ABSTRACT

Methods and systems are provided for receiving information, from a sensor coupled to a user, descriptive of a pace at which the user is exercising; determining a playback speed for video content having an audio component, the playback speed determined with reference to the pace at which the user is exercising; presenting the video content at the playback speed; generating a plurality of audio frames from the audio component of the video content, the plurality of audio frames being generated with reference to the pace at which the user is exercising; and presenting the plurality of audio frames to the user.

20 Claims, 4 Drawing Sheets

Related U.S. Application Data

(60) Provisional application No. 61/803,637, filed on Mar. 20, 2013.

(51) Int. Cl.
*A63F 13/212* (2014.01)
*A63F 13/816* (2014.01)

(56) References Cited

U.S. PATENT DOCUMENTS

| | | | |
|---|---|---|---|
| 7,628,730 B1 * | 12/2009 | Watterson | A63B 21/005 482/1 |
| 8,029,415 B2 | 10/2011 | Ashby et al. | |
| 8,251,874 B2 * | 8/2012 | Ashby | A63B 22/02 482/4 |
| 9,028,368 B2 | 5/2015 | Ashby et al. | |
| 2005/0075213 A1 | 4/2005 | Arick | |
| 2013/0178337 A1 * | 7/2013 | Brammer | A63B 71/0622 482/9 |

OTHER PUBLICATIONS

B.A.A.: Boston Marathon and ProForm Announce Partnership, Apr. 11, 2012.<http://www.baa.org/news-and-press/news-listing/2012/april/boston-marathon-and-proform-fitness-announce-partnership.aspx>.

Virtual Active: FAQ, May 12, 2011.<http://web.archive.org/web/20110512211639/http://www.vafitness.com/pages/faq>.

Techland: Got a Treadmill? Got a TV? You Can Run the Boston Marathon, Sep. 21, 2011.<http://web.archive.org/web/20110921031636/http://techland.time.com/2011/08/08/got-a-treadmill-got-a-tv-you-can-run-the-boston-marathon/>.

* cited by examiner

SYSTEMS AND METHODS OF INTERACTIVE EXERCISING

CROSS-REFERENCE TO RELATED PATENT APPLICATIONS

The present application is a continuation of U.S. patent application Ser. No. 14/168,349, titled "Systems and Methods of Interactive Exercising," filed on Jan. 30, 2014, which claims priority under 35 U.S.C. § 119(e) to U.S. Provisional Patent Application Ser. No. 61/803,637, titled "Systems and Methods of Interactive Exercising," filed on Mar. 20, 2013 ("the provisional application"), which is hereby incorporated herein by reference in its entirety.

BACKGROUND

Exercise can be tedious due to its routine nature. To decrease this tediousness by providing people with a varied exercise experience, the fitness industry has developed several different types of exercise equipment. For example, weight lifting systems, treadmills, ellipticals, and exercise bicycles are now commonplace within commercial gyms. In addition, commercial gyms often position televisions and stereo systems with close proximity to the exercise equipment, thus enabling customers to view or hear popular media, thereby enhancing their exercise experience.

SUMMARY

Some aspects disclosed herein describe a method including receiving information from a sensor coupled to a user, the information being descriptive of a first speed at which the user is exercising and displaying a video at a playback speed depending on the speed at which the user is exercising and a speed at which the video was filmed such that the speed at which the video is displayed is synchronized to the speed at which the user is exercising. Displaying the video at playback speeds different than normal playback speed can include manipulating the audio track of the video asynchronously. Adjusting the speed of the video to synchronize the speeds can be accomplished without reference to additional video metadata, such as frame rates, timestamps, or frame display times. Some aspects disclosed herein describe a method including filming a video of a path at a fixed speed and processing the video to simulate a user traversing the path at the fixed speed. The processing can include editing the video to more closely simulate a runner or cyclist moving along the path.

One implementation disclosed herein is a computer system includes a memory, at least one processor coupled to the memory, and a user interface component executable by the at least one processor and configured to receive information descriptive of a pace at which a user is exercising; present video content depicting a race at a playback speed dependent on the pace; and display a dashboard including an indication of the pace.

Another implementation disclosed herein is a method executed by a computer system including memory and at least one processor coupled to the memory. The method includes receiving information descriptive of a pace at which a user is exercising. The method further includes presenting video content depicting a race at a playback speed dependent on the pace. The method also includes displaying a dashboard including an indication of the pace.

Another implementation disclosed herein is a non-transitory computer-readable medium storing computer-executable sequences of instructions for simulating a race, the sequences of instructions including instructions configured to instruct at least one processor to receive information descriptive of a pace at which a user is exercising, present video content depicting the race at a playback speed dependent on the pace, and display a dashboard including an indication of the pace.

Still other aspects, embodiments and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
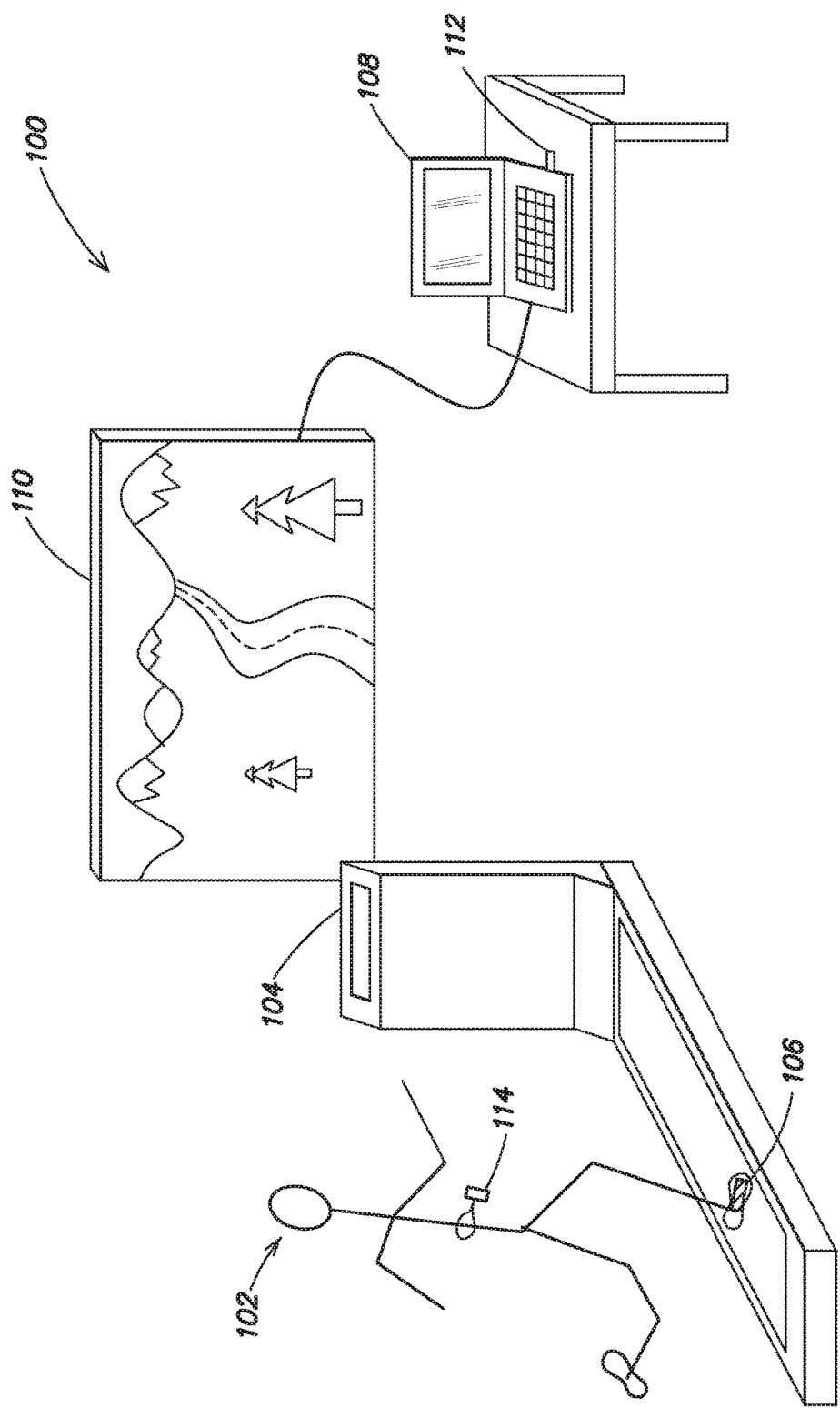
FIG. 1 is a block diagram of a computer system for an interactive exercising system, according to one implementation.

Some aspects disclosed herein describe a method that includes receiving information from a sensor coupled to a user, the information being descriptive of a first speed at which the user is exercising and displaying a video at a playback speed depending on the speed at which the user is exercising and a speed at which the video was filmed such that the speed at which the video is displayed is synchronized to the speed at which the user is exercising. The video may be displayed at varying playback speeds. In this implementation, the audio component may be larger than the video file, e.g., twice as long. Adjusting the speed of the video to synchronize the speeds can be accomplished without reference to additional video metadata, such as frame rates, timestamps, or frame display times. Some aspects disclosed herein describe a method including filming a video of a path at a fixed speed and processing the video to simulate a user traversing the path at the fixed speed. The processing can include editing the video to more closely simulate a runner or cyclist moving along the path.

Some of the aspects and embodiments disclosed herein describe new apparatus and processes of interactive exercising. In some embodiments the system includes a sensor that is attached to a user of an exercise machine. The sensor can also be attached to a wheel or other component of an exercise machine. In some embodiments, the sensor transmits signals to a computing device, which displays a video to the user. The display can be a part of the computing device, or an external display. The video may depict a path through which the user is virtually moving while exercising on the exercise machine. In some embodiments, the video display adjusts dynamically to synchronize with the pace of the user. According to various embodiments, the sensor, video, and playback module are configured to interoperate with a wide variety of exercise machines and computing devices.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples or embodiments are not intended to be excluded from a similar role in any other examples or embodiments.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Referring to FIG. 1, in some embodiments, the system 100 includes a sensor 106, which can be attached to a user 102. The user 102 can be using an exercise machine 104. The sensor 106 detects information descriptive of physical activity conducted by the user 102, such as speed, distance, pace, cadence, location, altitude, and heart rate. In some embodiments, the heart rate and other activity information can be received from a separate sensor or monitoring device, such as a heart rate monitor 114. In some embodiments, the system 100 renders feedback generated from the determined activity information to the user 102 while the user exercises on a stationary exercise machine (e.g., a treadmill). Thus, in some embodiments, the actual location of the user 102 may not change while the feedback is rendered.

The sensor 106 can determine the activity information in various ways known in the art. For example, in some embodiments, the sensor 106 includes a foot pod compatible with the ANT+™ standard, such as a footpad available from Dynastream Innovations, Inc. of Cochrane, Alberta, Canada. In other embodiments, the sensor 106 includes a foot pod compatible with the Bluetooth protocol or other wireless protocols. Other methods for determining the activity information can be found in US Patent Publication 2005/0075213, titled "Exercise Device Independent, Variable Display Rate Visual Exercise System," filed Aug. 26, 2004, which is hereby incorporated herein by reference in its entirety.

In some embodiments, the sensor 106 transmits the activity information to a computing device 108. For example, a Universal Serial Bus (USB) stick 112, such as an ANT+ USB stick, can be connected to the computing device 108, including, but not limited to, a laptop computer or other personal computer, a smartphone, other mobile phone, handheld computer, a tablet PC, or other computing device, such as a laptop computer or a tablet computer (such as the iPad® commercially available from Apple Inc. of Cupertino, Calif.) and configured to receive the information detected by the sensor 106. The computing device 108 can be connected to a display device 110. Alternatively or additionally, the computing device 108 can include a display and show information and video without an external display device 110. In some embodiments, the display on the computing device 108 can be used in conjunction with the display device 110, for example, showing a video on the display device 110 and showing the video or other information on the computing device 108.

In some embodiments, the display device 110 displays a video of a path on which the user 102 is virtually running According to these embodiments, as the user 102 runs on the exercise machine 104, the video advances, virtually advancing the user 102 down the path shown in the video. The speed at which the video is displayed on the display device 110 is synchronized with the pace at which the user 102 is running. The speed of the video is adjusted based on the activity information transmitted by the sensor 106 and received by the computing device 108.

According to some embodiments, the video is filmed as a runner running on the path at a fixed known speed, for example, 6 miles per hour (mph). Thus, using the filmed speed and the running speed of the user 102, the computing device 108 can output the video to the display device 110 at different playback speeds to synchronize the running of the user 102 with the speed of the video. As a result, the user 102 can experience a more realistic virtual running environment.

For example, if the user 102 is running at 9 mph on the treadmill, the sensor 106 can detect that the user 102 is running at 9 mph and transmit the speed information to the computing device 108. In some embodiments, the computing device 108 can determine the speed of the user based on information detected by the sensor 106. If the video was shot at 6 mph, the computing device 108 can set the playback speed of the video to 1.5 times normal speed, thus displaying a video that seems to move at 9 mph. In this way, mile markers and other landmarks displayed in the video will correspond to the speed of the user 102. If the user 102 slows down, for example, to 6 mph, the sensor 106 can detect changes in speed and transmit the information to the computing device 108. The computing device 108 can adjust the playback speed accordingly, slowing down to normal playback speed, corresponding to the user's 6 mph running speed. The computing device 108 can adjust the playback speed gradually to synchronize more accurately to the user's speed changes.

As the sensor 106 may be attached to the user 102, the system can be implemented with any exercise machine, or without an exercise machine, such as by a user running in place. As the computing device 108 simply changes the playback speed of the pre-recorded video, the system can be implemented with various types of computing devices and with any video including content filmed at a known speed.

The video can also include an audio component. The audio component may be adjusted along with the video track and thus may change pitch where the video track speed is increased or decreased. The computing device 108 can adjust the audio component separately from the video track to prevent pitch change that could occur from simply changing the playback speed of the audio. The audio can be adjusted using techniques known in the art for speeding up and slowing down audio without altering the pitch of the audio. Alternatively or additionally, the audio can be adjusted, for example, by dropping audio frames when the video is played at a faster than normal speed. The audio track can be analyzed to select audio frames to drop that can be less noticeable than other audio frames. For example, the audio can be adjusted by dropping audio frames with lower amplitudes, indicating less auditory information in the frames being dropped. The dropped audio frames can be frames of sound that is more ambient or white noise rather than specific sounds, such as a nearby runner's footsteps or a car driving by. The audio can also be adjusted, for example, by adding frames or additional layers of audio tracks when the video is played at a slower than normal speed. For example, the audio track can be copied and added as one or more additional layers of audio. The additional layers can be time shifted and/or blended to produce more ambient noise for the additional frames of audio needed to cover the longer length of time the video is shown, as it is played back slower than normal speed. In some embodiments, portions of the audio can be looped to cover the extra length of time. The audio track can similarly be analyzed to select portions that are more indicative of ambient or background noise for copying.

The system can also include multiple versions of a video. For example, the system can include videos of a path filmed at different speeds. The different speeds can correspond to different activities. For example, a path can be filmed at a slower speed for users to virtually run on the path, and filmed at a faster speed for users to bike on the path. For example, the system can include a video of a path filmed at 6 mph for runners, and a video of the path filmed at 15 mph for cyclists.

In some implementations, the system can include a single pace for each activity. In other implementations, the system can also use multiple speeds for each activity. For example, a path can be filmed at various different running speeds, such as a 6 mph pace and an 8 mph pace. The system can dynamically switch between videos depending on the speed of the user. For example, a user can start running on a treadmill at a 6 mph pace. The system can display the 6 mph video to the user at normal speed to correspond to the user's running pace. The user can decide to start running faster. As the user approaches 7 mph, the system can continue to display the 6 mph video, playing the video at a faster than normal speed, corresponding to the user's speed. As the user exceeds 7 mph, the system can switch over to the 8 mph video, played back at a slower speed to correspond to the user's speed. The system can use a mile marker or a time offset from the beginning of the video, calibrated for the various playback speeds to determine where in the 8 mph video the system should start playing so that the user continues on the path at the same point. The system can also use different speed differences to decide when to cut over to the second video. For example, if a video can look more realistic for greater differences in playback speed when sped up as opposed to slowed down, the system can use a speed closer to 8 mph at the point at which to cut over to the 8 mph video. In some embodiments, the cut over determinations can depend on the factor of the playback speed, rather than, or in addition to, the pace at which the video is filmed.

The system can also indicate the slope of the path so that the user can adjust the tilt of the exercise device accordingly. As the user runs at a slope corresponding to the video, the system can provide a more realistic virtual running environment. For stationary bikes, the system can indicate an appropriate corresponding resistance that would provide a more realistic virtual biking environment. For example, the system can include a lookup table with degrees of incline and decline corresponding to specific tilt numbers and resistance numbers for the exercise devices. As the video of the path traverses changing slopes, the video can include a message to the user to change the tilt or resistance as appropriate. The video can display both tilt and resistance messages, or the video can display one or the other depending on the filmed speed of the video. For example, the videos filmed at speeds more appropriate for running can display only the tilt messages, while the videos filmed at speeds more appropriate for cycling can display only the resistance messages.

In some embodiments, the computing device 108 can have an interface through which the computing device 108 can communicate directly with the exercise machine 104. For example, the exercise machine 104 can include an output port that can be connected via a cable to a tablet computer, such as an iPad®, available from Apple, Inc. of Cupertino, Calif., or other computing device 108. In another implementation, exercise machine 104 may communicate with the computing device 108 via ANT+, Bluetooth pairing, or any other appropriate wireless method. The computing device 108 can receive information directly from the exercise machine 104, such as speed, tilt, resistance, cadence, time elapsed, and user heart rate. The computing device 108 can use the activity information received from the exercise machine 104 to control the playback speed of the video, as described above. In some embodiments the exercise machine 104 can also receive information and commands from the computing device 108. For example, the computing device 108 can issue commands to the exercise machine 104 to change the tilt or resistance to correspond to the changing slope of the path shown on the video. In some embodiments, communication through the interface can include using an API. For example, an Outside Interactive Virtual Runner Framework (VRF) can provide a library of commands and data through which the computing device 108 can communicate with the exercise machine 104 and vice versa. An example of such a framework is described in attached Appendix C of the provisional application.

Figure 2:
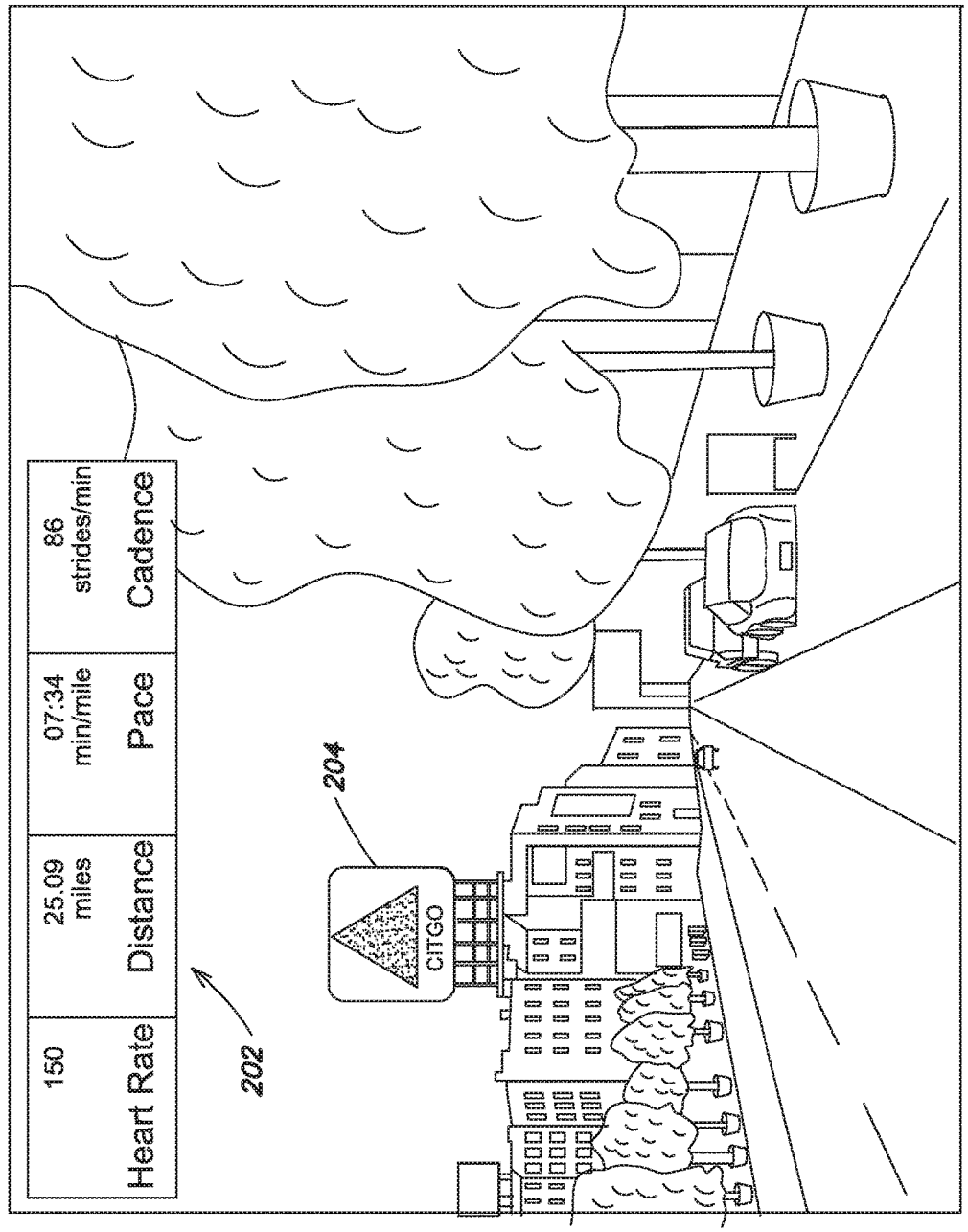
FIG. 2 is an example of a screenshot of the interactive exercising system according to one implementation.

The system can also show user information about the user and/or the exercise session with the video. For example, referring to FIG. 2, the system can display a dashboard 202 that shows user information received by the computing device from the sensor. The dashboard 202 can include information such as time the user has been using the system, the user's current heart rate, the user's average heart rate, the user's distance run or cycled, the user's current pace, the user's average pace, the user's current cadence, the user's average cadence, calories burned by the user, and other information related to the user and the exercise session. The dashboard 202 can also display information or elements directed to the user. For example, the dashboard 202 can display elements configured to encourage or motivate the user. The system can store personal records including fastest times for each path and the dashboard 202 can display the current pace and whether the user is on pace to beat the personal record for the path. The dashboard 202 can also display encouraging or motivating elements depending on the detected speed of the user. For example, the dashboard 202 can display an encouraging phrase if the system detects that the user is speeding up, and/or a motivating phrase if the system detects that the user is slowing down. The speeding up and slowing down can be relative to a current speed and/or past speeds, such as an average speed for the user on the path, or a speed of the last run by the user on the path, or a fastest speed for the user on the path.

The audio can also be utilized to present information or elements directed at the user. For example, the encouraging and/or motivating phrases can be an audio recording played to the user. The audio recording can be pre-recorded in the system or phrases recorded or provided by the user. For example, the user can have a coach or other person that is especially motivating or encouraging to the user provide audio recordings of phrases that can be designated as encouraging or motivating and played accordingly. The audio recordings can also include such encouragement as a cheering crowd for when the user speeds up or when the user nears the end of a path. The audio recordings can also include phrases for when personal records are broken and for distance milestones.

In another implementation, the audio component and/or the image component of the video content may include a content item, such as an advertisement for a race's sponsor. For example, the advertisement may be displayed as a screen overlay. In another example, the advertisement may be provided as an audio jingle. The content item may also be altered, depending on the user, the system, etc. For example, the user may have provided data that they need new running shoes and, therefore, the advertisement that is displayed on a nearby billboard is for Brand A running shoes.

The video can also display landmarks that are nearby. For example, as the user runs by the CITGO sign 204 in FIG. 2, the video can display a smaller frame with a closer shot or picture of the CITGO sign 204. The video can also display information about the landmarks, such as interesting facts or a history of the landmarks. The video can also display landmarks that are nearby but not visible on the path as filmed. For example, in FIG. 2, the video can also display information about Fenway Park, a famous landmark nearby that may not be visible on the filmed path. The audio can also be utilized for providing information about the landmarks.

In some implementations, the dashboard 202 may represent each user as an avatar within the video, i.e., virtual environment. During the exercise, when a second user wishes to contact a first user, a variety of methods may be used, including, but not limited to, text, email, verbal (audio), etc. The first and the second user may interact during exercise or in another fashion. For example, social media may be used to link the first and the second user.

Social media, such as a social networking platform, may also be used for communication between the first user and the second user. In some implementations, the communication may be displayed on the dashboard 202 with each respective avatar, such as chats, messages, posts, etc. For example, in some embodiments, the computing device 108 executes a periodic polling process that gathers communications directed to social media accounts associated with the user. The periodic polling process may execute, via an internet connection, instructions that subscribe to application program interfaces (APIs) supported by social media websites.

According to some embodiments, the dashboard 202 is configured to allow users to easily share exercise related activities and accomplishments with their social network. In these embodiments, the dashboard 202 includes actionable user interface elements that, when actuated, post commentary related to the user's exercise activity to social media accounts associated with the user via one or more APIs. The commentary may be system provided (i.e., the system may recognize achievement of a milestone and present content describing it). The commentary may also be user provided (i.e., the user inputs commentary). In either case, in some embodiments, the dashboard 202 includes a share button, that when actuated, transmits the commentary to social media accounts with the user. In this way, the commentary may be posted to the user's wall, added to the user's profile, etc.

As discussed above, the video can be filmed at a known, fixed speed, which allows a computing device 108 to synchronize the video with the speed of the runner by changing the playback speed of the video. Due to the known, fixed speed of the video, the computing device 108 can synchronize the video with the speed of the runner without needing additional information about frame rates, timestamps of frames, or native frame display times. In some embodiments, such information can be used in addition to the known, fixed filmed speed. The video can be further synchronized with the speed of the user and the user's exercise machine by measuring the time taken to run a known distance on the video, independent of the information from the exercise machine. The process to further synchronize the video with the user's exercise machine is described in further detail in Appendix B of the provisional application.

The video can be filmed at a fixed known speed by using a vehicle moving at a fixed speed on the path. For example, the video can be filmed by a video camera operator on a motorized scooter or personal transporter, such as a Segway®, available from Segway Inc. of Bedford, N.H. The personal transporter can be set to the fixed known speed desired for the video. Alternatively or additionally, another device, such as a global positioning system (GPS) device can be used to keep the personal transporter moving at a relatively fixed speed. The video camera operator can stabilize the video camera on the personal transporter or using a camera steadying apparatus, such as Steadicam® commercially available from Tiffen® of Hauppaugue, N.Y. The camera steadying apparatus may be worn by the operator and steadied against the operator's body. The personal transporter can be modified to be more easily operated and maneuvered without using the operator's hands. For example, the handlebar of the personal transporter can be replaced with a structure that allows the operator to maneuver the personal transporter using the operator's legs. In some embodiments, the video can be edited to further fix the speed of the video. For example, the video can be divided into one mile (or any other appropriate) segments and sped up or slowed down to match the desired pace of the video. For example, a three mile path filmed at a 6 mph pace should take 10 minutes per mile. In filming the video, the first mile can end up being 11 minutes long, while the second mile is 9 minutes long. The video can be edited to speed up the pace of the first mile so that it takes 10 minutes. The video can be further edited to slow down the pace of the second mile so that it also takes 10 minutes. This way, each mile of the video is shown at a 10 minute per mile (6 mph) pace.

Computer System

As discussed above with regard to FIGS. 1 and 2, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices (i.e., computer systems with a size, weight, and general form factor capability of being routinely transported by a human without assistance), such as cellular phones, tablet computers, and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 3:
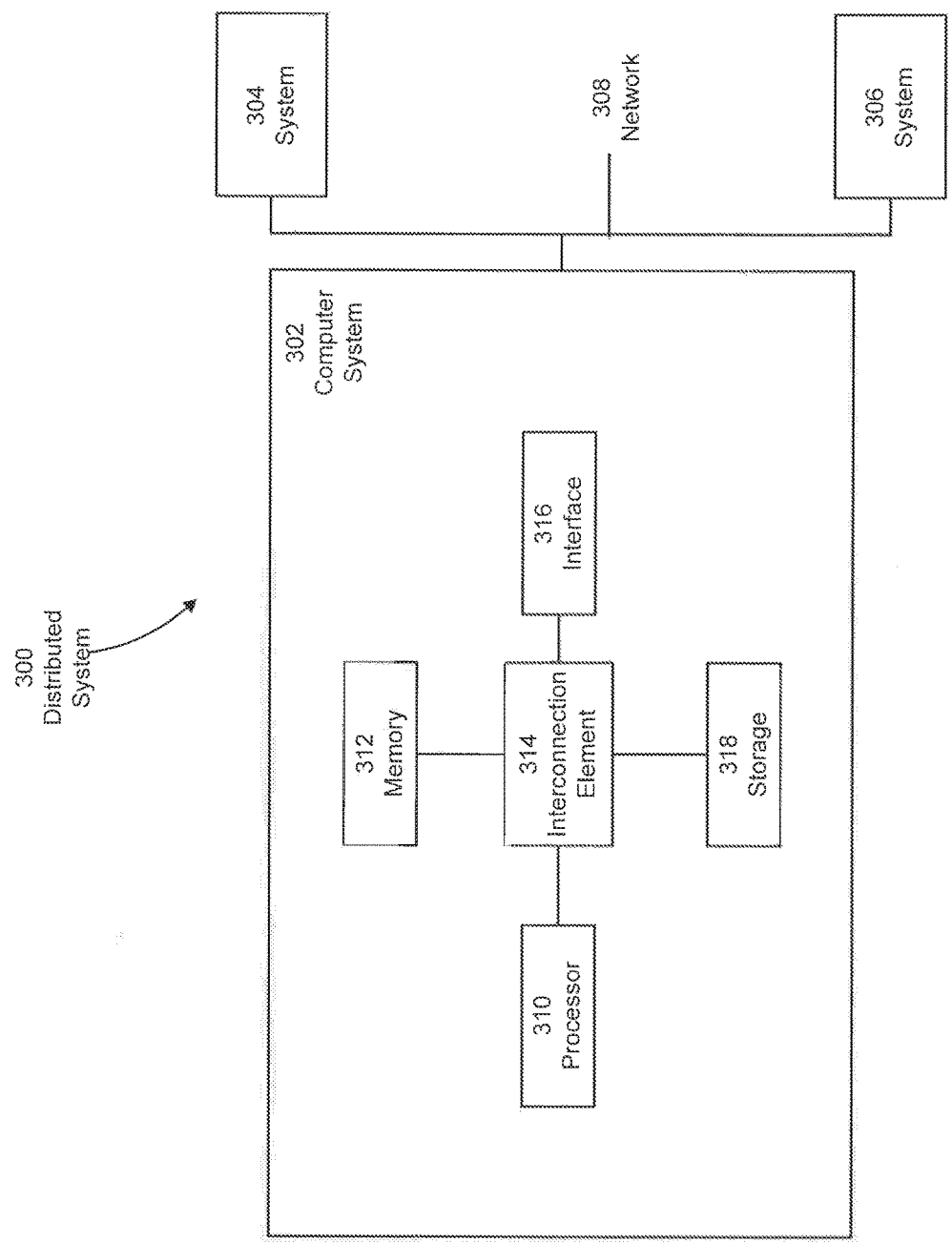
FIG. 3 is a block diagram of an example computer system used to implement aspects of an exemplary interactive exercising system.

Referring to FIG. 3, there is illustrated a block diagram of a distributed computer system 300, in which various aspects and functions are practiced. As shown, the distributed computer system 300 includes one more computer systems that exchange information. More specifically, the distributed computer system 300 includes computer systems 302, 304 and 306. As shown, the computer systems 302, 304 and 306 are interconnected by, and may exchange data through, a communication network 308. The network 308 may include any communication network through which computer systems may exchange data. To exchange data using the network 308, the computer systems 302, 304 and 306 and the network 308 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 302, 304 and 306 may transmit data via the network 308 using a variety of security measures including, for example, TLS, SSL or VPN. While the distributed computer system 300 illustrates three networked computer systems, the distributed computer system 300 is not so limited and may include any number of computer systems and computing devices, networked using any medium and communication protocol.

As illustrated in FIG. 3, the computer system 302 includes a processor 310, a memory 312, an interconnection element 314, an interface 316 and data storage element 318. To implement at least some of the aspects, functions and processes disclosed herein, the processor 310 performs a series of instructions that result in manipulated data. The processor 310 may be any type of processor, multiprocessor or controller. Some exemplary processors include commercially available processors such as an Intel Xeon, Itanium, Core, Celeron, or Pentium processor, an AMD Opteron processor, an Apple A4 or A5 processor, a Sun UltraSPARC or IBM Power5+ processor and an IBM mainframe chip. The processor 310 is connected to other system components, including one or more memory devices 312, by the interconnection element 314.

The memory 312 stores programs and data during operation of the computer system 302. Thus, the memory 312 may be a relatively high performance, volatile, random access memory such as a dynamic random access memory ("DRAM") or static memory ("SRAM"). However, the memory 312 may include any device for storing data, such as a disk drive or other nonvolatile storage device. Various examples may organize the memory 312 into particularized and, in some cases, unique structures to perform the functions disclosed herein. These data structures may be sized and organized to store values for particular data and types of data.

Components of the computer system 302 are coupled by an interconnection element such as the interconnection element 314. The interconnection element 314 may include one or more physical busses, for example, busses between components that are integrated within a same machine, but may include any communication coupling between system elements including specialized or standard computing bus technologies such as IDE, SCSI, PCI and InfiniBand. The interconnection element 314 enables communications, such as data and instructions, to be exchanged between system components of the computer system 302.

The computer system 302 also includes one or more interface devices 316 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 302 to exchange information and to communicate with external entities, such as users and other systems.

The data storage element 318 includes a computer readable and writeable nonvolatile, or non-transitory, data storage medium in which instructions are stored that define a program or other object that is executed by the processor 310. The data storage element 318 also may include information that is recorded, on or in, the medium, and that is processed by the processor 310 during execution of the program. More specifically, the information may be stored in one or more data structures specifically configured to conserve storage space or increase data exchange performance. The instructions may be persistently stored as encoded signals, and the instructions may cause the processor 310 to perform any of the functions described herein. The medium may, for example, be optical disk, magnetic disk or flash memory, among others. In operation, the processor 310 or some other controller causes data to be read from the nonvolatile recording medium into another memory, such as the memory 312, that allows for faster access to the information by the processor 310 than does the storage medium included in the data storage element 318. The memory may be located in the data storage element 318 or in the memory 312, however, the processor 310 manipulates the data within the memory, and then copies the data to the storage medium associated with the data storage element 318 after processing is completed. A variety of components may manage data movement between the storage medium and other memory elements and examples are not limited to particular data management components. Further, examples are not limited to a particular memory system or data storage system.

Although the computer system 302 is shown by way of example as one type of computer system upon which various aspects and functions may be practiced, aspects and functions are not limited to being implemented on the computer system 302 as shown in FIG. 3. Various aspects and functions may be practiced on one or more computers having a different architectures or components than that shown in FIG. 3. For instance, the computer system 302 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 302 may be a computer system including an operating system that manages at least a portion of the hardware elements included in the computer system 302. In some examples, a processor or controller, such as the processor 310, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system or an iOS operating system available from Apple Computer, one of many Linux-based operating system distributions, for example, the Enterprise Linux operating system available from Red Hat Inc., a Solaris operating system available from Sun Microsystems, a UNIX operating systems available from various sources, or an Android based operating system available from Google Inc. Many other operating systems may be used, and examples are not limited to any particular operating system.

The processor 310 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, C# (C-Sharp), Python, or JavaScript. Other object-oriented programming languages may also be used. Alternatively, functional, scripting, or logical programming languages may be used.

Interactive Exercise Methods

Figure 4:
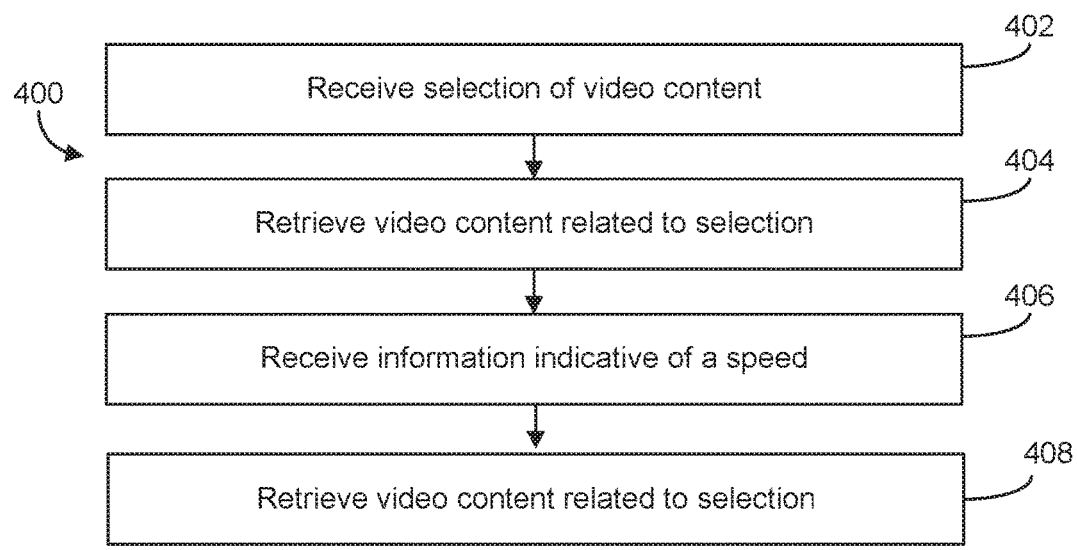
FIG. 4 is a flow chart of a method for displaying video content, according to one implementation.

FIG. 4 is a block diagram of a method for displaying video content, according to one implementation. In a general overview, a selection of video content is received at a server (block 402). Video content related to the selection is retrieved from a database (block 404). Information indicative of a speed is received from a sensor (block 406). Based on the speed, the video content is displayed (block 408).

At block 402, the selection of the video content may be performed at a user device. The user device may be a client device, such as a mobile phone, a tablet computer, or any other appropriate client device. The user device may be implemented with a treadmill or other exercise equipment.

At block 404, the video content related to the selection may be retrieved from a database. At block 406, a sensor may receive information indicative of a speed. In some implementations, the sensor is coupled to the user device. In another implementation, the sensor is coupled to an article of clothing, such as a shoe, a strap, etc. of the user. The information indicative of a speed may include the speed of a gait of a user. In another implementation, the information indicative of a speed may include a speed of the video content. In yet another implementation, the information indicative of a speed may include a speed of the exercise equipment, such as the treadmill, a stair climber, an elliptical trainer, etc.

At block 408, based on the speed, the video content is displayed. The display of the video content may include an audio component and an image component. The audio component may include a song. The image component may include a race route. In some implementations, the image component may be displayed as an overlay. For example, the race route may be displayed as an overlay on a default screen of the exercise equipment.

In some implementations, the displayed video content may be configurable by the user. For example, the user may change the race route, depending on the mileage. The user may also select different songs along the race route. In yet another example, the user may select other users to run alongside them. In this example, the user may connect with other users, via social networking application, to run the race route together or against each other.

The display of the video content may be displayed at a playback speed. The playback speed may be synchronized to the information indicative of a speed, e.g., the speed of the user. In other implementations, the video content may be provided at a fixed speed, e.g., the video content is processed to simulate the user traversing a route at the fixed speed.

In another implementation, the video content may include an incline. For example, if the video content is the Boston Marathon race route, then the video content will include Heartbreak Hill. In some implementations, the incline of the video content corresponds to an incline of the user device. For example, the user may manually adjust the incline of the user device to match the incline of the video content, which allows the exercise equipment to also correspondingly incline. In another example, the incline of the exercise equipment may automatically match the incline of the video content based on the user device.

Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g. specialized hardware, executable code, data structures or objects that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

The operations described in this specification can be implemented as operations performed by a data processing apparatus on data stored on one or more computer-readable storage devices or received from other sources.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Having thus described several aspects of at least one example, it is to be appreciated that various alterations, modifications, and improvements will readily occur to those skilled in the art. For instance, examples and embodiments disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A computer system comprising:
   a memory;
   at least one processor coupled to the memory; and
   a user interface component executable by the at least one processor and configured to:
      receive information from a sensor coupled to a user descriptive of a pace at which the user is exercising;
      determine a playback speed for previously filmed video content captured contemporaneously with an audio component, the playback speed determined with reference to the pace at which the user is exercising;
      present the video content at the playback speed;
      generate a plurality of audio frames from the audio component, the plurality of audio frames being generated with reference to the pace at which the user is exercising; and
      present the plurality of audio frames to the user.

2. The computer system of claim 1, further comprising an interface to an exercise machine upon which the user is exercising, the interface enabling communication between the computer system and the exercise machine.

3. The computer system of claim 2, wherein the computer system is configured to communicate one or more commands to the exercise machine, the one or more commands including at least one command to adjust at least one of an incline and a resistance of the exercise machine.

4. The computer system of claim 1, wherein generating the plurality of audio frames includes periodically synchronizing the plurality of audio frames with the audio component.

5. The computer system of claim 1, wherein generating the plurality of audio frames includes:
   determining that the pace at which the user is exercising is faster than a speed at which the video content is filmed;
   analyzing two or more preliminary audio frames to identify at least one audio frame as a candidate for removal; and
   dropping the at least one audio frame from the two or more preliminary audio frames.

6. The computer system of claim 5, wherein analyzing the two or more preliminary audio frames to identify at least one audio frame as a candidate for removal includes identifying at least one audio frame having an amplitude below a threshold value.

7. The computer system of claim 5, wherein analyzing the two or more preliminary audio frames to identify at least one audio frame as a candidate for removal is based on an amount of ambient noise in the at least one audio frame.

8. A method executed by a computer system including memory and at least one processor coupled to the memory, the method comprising:
   receiving information, from a sensor coupled to a user, descriptive of a pace at which the user is exercising;
   determining a playback speed for previously filmed video content captured contemporaneously with an audio component, the playback speed determined with reference to the pace at which the user is exercising;
   presenting the video content at the playback speed;
   generating a plurality of audio frames from the audio component, the plurality of audio frames being generated with reference to the pace at which the user is exercising; and
   presenting the plurality of audio frames to the user.

9. The method of claim 8, further comprising communicating at least one command to the exercise machine, the at least one command including at least one command to adjust at least one of an incline and a resistance of the exercise machine.

10. The method of claim 8, wherein generating the plurality of audio frames includes periodically synchronizing the plurality of audio frames with the audio component.

11. The method of claim 8, wherein generating the plurality of audio frames includes:
    determining that the pace at which the user is exercising is faster than a speed at which the video content is filmed;
    analyzing two or more preliminary audio frames to identify at least one audio frame as a candidate for removal; and
    dropping the at least one audio frame from the two or more preliminary audio frames.

12. The method of claim 11, wherein analyzing the two or more preliminary audio frames to identify at least one audio frame as a candidate for removal includes identifying at least one audio frame having an amplitude below a threshold value.

13. The method of claim 11, wherein analyzing the two or more preliminary audio frames to identify at least one audio frame as a candidate for removal is based on an amount of ambient noise in the at least one audio frame.

14. A non-transitory computer-readable medium storing computer-executable sequences of instructions for simulating a race, the sequences of instructions including instructions configured to instruct at least one processor to:

receive information, from a sensor coupled to a user, descriptive of a pace at which the user is exercising;

determine a playback speed for previously filmed video content captured contemporaneously with an audio component, the playback speed determined with reference to the pace at which the user is exercising;

present the video content at the playback speed;

generate a plurality of audio frames from the audio component, the plurality of audio frames being generated with reference to the pace at which the user is exercising; and present the plurality of audio frames to the user.

15. The computer-readable medium of claim 14, wherein the instructions further instruct the at least one processor to implement an application program interface enabling communication between the computer system and an exercise machine upon which the user is exercising.

16. The computer-readable medium of claim 15, wherein the instructions further instruct the at least one processor to communicate at least one command to the exercise machine, the at least one command including at least one command to adjust at least one of a resistance and an incline of the exercise machine.

17. The computer-readable medium of claim 14, wherein generating the plurality of audio frames includes periodically synchronizing the plurality of audio frames with the audio component.

18. The computer-readable medium of claim 14, wherein the instructions further instruct the at least one processor to:

determine that the pace at which the user is exercising is faster than a speed at which the video content is filmed;

analyze two or more preliminary audio frames to identify at least one audio frame as a candidate for removal; and drop the at least one audio frame from the two or more preliminary audio frames.

19. The computer-readable medium of claim 18, wherein analyzing the two or more preliminary audio frames to identify at least one audio frame as a candidate for removal includes identifying at least one audio frame having an amplitude below a threshold value.

20. The computer-readable medium of claim 18, wherein analyzing the two or more preliminary audio frames to identify at least one audio frame as a candidate for removal is based on an amount of ambient noise in the at least one audio frame.

\* \* \* \* \*